3,005,012
TETRAALKYLAMMONIUM BORATES
John F. Mulloy, Midland, Mich., assignor to The Dow Chemical Company, Midland, Mich., a corporation of Delaware
No Drawing. Filed Mar. 20, 1959, Ser. No. 800,660
8 Claims. (Cl. 260—462)

This invention relates to organic chemical compounds, which are alkyltrimethylammonium borates and to a method for the preparation of these compounds.

The compounds of the present invention have the formula:

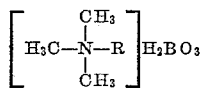 $H_2BO_3$ wherein R is an alkyl radical of from 8 to 22 carbon atoms.

The compounds of the present invention are nearly white, waxy solids, soluble in water, lower aliphatic alcohols, one (1) percent aqueous sodium hydroxide solution, benzene, xylene, gasoline and kerosene.

The starting materials for the preparation of each of the compounds of the present invention are silver oxide and an alkyltrimethylammonium chloride having the formula:

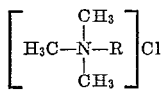 Cl wherein R is an alkyl radical of from 8 to 22 carbon atoms. An aqueous solution of the alkyltrimethylammonium chloride is reacted with the silver oxide at about room temperature and the resulting silver chloride is removed from the solution, preferably by filtration. Desirably, the solution is then decolorized by adding activated charcoal, such as, for example, "Darco" and a filter aid, such as, for example, "Filter-Cel". The activated charcoal and the filter aid are conveniently removed from the solution, as by filtration. The alkyltrimethylammonium hydroxide solution is then reacted with orthoboric acid, $H_3BO_3$, and the water formed by the reaction is removed from the reaction mixture. Preferably, the water is evaporated by heating the reaction mixture under reduced pressure, such as, for example, on a steam bath. The alkyltrimethylammonium borate then remains as a residue in the reaction flask.

The following examples illustrate the invention, but are not to be construed as limiting the invention thereto:

Example I

Sixty-six (66) grams (0.25 mole) of dodecyltrimethylammonium chloride were dissolved in 230 grams of water. To this solution were added 39 grams (0.13 mole) of silver oxide. After stirring vigorously and allowing 10–15 minutes for complete precipitation, the mixture was filtered to remove the precipitated silver chloride. The filtrate, consisting of dedecyltrimethylammonium hydroxide, was decolorized by adding 10 grams of Darco and 15 grams of Filter-Cel, and the solution was re-filtered to remove the Darco and the Filter-Cel from the solution. The dodecyltrimethylammonium hydroxide was then treated with 15 grams of orthoboric acid and the solution heated on a steam bath at a pressure of 40–50 millimeters of mercury, absolute, to remove the water formed by the reaction. There remained, as a residue, 48 grams (65 percent of the theoretical yield) of dodecyltrimethylammonium borate, a nearly white, waxy solid.

Example II

In a manner similar to that in Example I, tridecyltrimethylammonium borate was prepared by reacting a solution of 70 grams (0.25 mole) of tridecyltrimethylammonium chloride in 230 grams of water with 39 grams (0.13 mole) of silver oxide, removing the precipitated silver chloride by filtration, decolorizing the tridecyltrimethylammonium hydroxide solution, re-filtering the solution to remove the filter aids, and treating the solution with 15 grams of orthoboric acid and heating the solution on a steam bath at a pressure of 40–50 mm. to remove the water formed by the reaction. There remained, as a residue, 49 grams (64 percent of the theoretical yield) of tridecyltrimethylammonium borate, a nearly white, waxy solid.

Example III

In a manner similar to that in Examples I and II, hexadecyltrimethylammonium borate was prepared by reacting a solution of 80 grams (0.25 mole) of hexadecyltrimethylammonium chloride in 230 grams of water with 39 grams (0.13 mole) of silver oxide, removing the precipitated silver chloride by filtration, decolorizing the hexadecyltrimethylammonium hydroxide solution, re-filtering the solution to remove the filter aids, and treating the solution with 15 grams of orthoboric acid and heating the solution on a steam bath at a pressure of 40–50 mm. to remove the water formed by the reaction. There remained, as a residue, 56 grams (65 percent of the theoretical yield) of hexadecyltrimethylammonium borate, a nearly white, waxy solid.

The alkyltrimethylammonium borates of the present invention have proven utility as nematocides. Dodecyltrimethylammonium borate, tridecyltrimethylammonium borate, and hexadecyltrimethylammonium borate were each tested for nematocidal activity, as shown by the following experiments:

Six (6) milliliters of larval rootknot nematode (Meloidogyne SPP) suspension were diluted with distilled water, the solution buffered to pH 7.0 with 0.01 M potassium phosphate, and placed in a small glass vial. The test solution was formulated by dissolving 1 gram in 50 milliliters of acetone. 0.25 ml. of this solution was dissolved in 200 ml. of distilled water, then 4 ml. of this final composition were added to the 6 ml. of nematode suspension, to give a concentration of 10 parts per million of the test material. Two blank determinations were also prepared and run concurrently, one containing acetone and one containing distilled water. The vials were then capped and allowed to incubate for 6 days at 80° F. The percent mortality was then determined. Dodecyltrimethylammonium borate and hexadecyltrimethylammonium borate each effected a 100 percent kill, while tridecyltrimethylammonium borate effected an 80 percent kill. The blank acetone sample showed a 10 percent kill and the blank aqueous sample a 5 percent kill.

The compounds of the present invention also have proven utility as growth inhibitors for grasses. Dodecyltrimethylammonium borate, tridecyltrimethylammonium borate, and hexadecyltrimethylammonium borate were each evaluated as growth inhibitors as shown by the following experiments:

Dodecyltrimethylammonium borate, tridecyltrimethylammonium borate, and hexadecyltrimethylammonium borate were each dissolved in water to prepare separate aqueous compositions containing 0.08 pound of the alkyltrimethylammonium borate per 100 gallons of solution, i.e., 100 parts per million by weight. These aqueous compositions were employed for the treatment of seed beds which had been prepared and seeded with seeds of Phalaris canariensis (canary grass). In the treating operations, the aqueous compositions were applied as a drench and at the rate of about 0.08 acre inch of aqueous composition per acre to furnish a substantially uniform dosage of about 9 pounds of one of the organic borates per acre. Other seed beds, prepared in a similar manner and planted with seeds of *Phalaris canariensis*, were left untreated to serve as checks.

After about two weeks, the seed beds were examined to ascertain what control of the growth of seeds and emerging seedlings had been obtained. The organic borates employed together with the observed percent kills of the seeds and seedlings are set forth in the following table:

| Test Compound | Percent Kill of the Seeds and Emergent Seedlings of *Phalaris canariensis* |
|---|---|
| Dodecyltrimethylammonium borate | 80 |
| Tridecyltrimethylammonium borate | 100 |
| Hexadecyltrimethylammonium borate | 90 |

At the time of the above observations, the untreated beds were found to support luxuriant growth of *Phalaris canariensis*.

The compounds of the present invention, in addition to the specific experiments shown above, are adaptable for use as nematocides and growth inhibitors for grasses in media other than described above. The claimed compounds may be employed as nematocides in other growth media, such as, for example, soil, expanded mica, and exploded aluminum silicate. Also, the claimed compounds may be used as growth inhibitors for grasses in other media, such as, for example, exploded aluminum silicate, expanded mica, and crushed stone.

While the above examples describe certain specific starting compounds, other alkyltrimethylammonium chlorides may be employed as starting compounds, such as, for example, octyltrimethylammonium chloride, nonyltrimethylammonium chloride, decyltrimethylammonium chloride, hendecyltrimethylammonium chloride, tetradecyltrimethylammonium chloride, pentadecyltrimethylammonium chloride, heptadecyltrimethylammonium chloride, octadecyltrimethylammonium chloride, nonadecyltrimethylammonium chloride, eicosyltrimethylammonium chloride, docosyltrimethylammonium chloride, and the like, and analogous alkyltrimethylammonium borates obtained therefrom.

Various modifications may be made in the method of the present invention without departing from the spirit or scope thereof, and it is to be understood that I limit myself only as defined in the appended claims.

I claim:
1. Alkyltrimethylammonium borates having the formula:

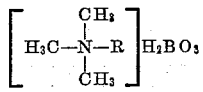

wherein R is an alkyl radical of from 8 to 22 carbon atoms.
2. Dodecyltrimethylammonium borate.
3. Tridecyltrimethylammonium borate.
4. Hexadecyltrimethylammonium borate.
5. A method for preparing alkyltrimethylammonium borates having the formula:

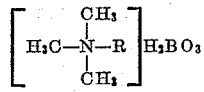

wherein R is a lower alkyl radical of from 8 to 22 carbon atoms, comprising reacting orthoboric acid with an alkyltrimethylammonium hydroxide having the formula:

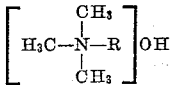

wherein R is a lower alkyl radical of from 8 to 22 carbon atoms, and removing from the reaction mixture the water thus formed.
6. A method for preparing dodecyltrimethylammonium borate comprising reacting orthoboric acid with dodecyltrimethylammonium hydroxide, and removing from the reaction mixture the water thus formed.
7. A method for preparing tridecyltrimethylammonium borate comprising reacting orthoboric acid with tridecyltrimethylammonium hydroxide, and removing from the reaction mixture the water thus formed.
8. A method for preparing hexadecyltrimethylammonium borate comprising reacting orthoboric acid with hexadecyltrimethylammonium hydroxide, and removing from the reaction mixture the water thus formed.

References Cited in the file of this patent

UNITED STATES PATENTS

| | | |
|---|---|---|
| 2,629,732 | Schechter | Feb. 24, 1953 |
| 2,642,453 | Lippincott | June 16, 1953 |
| 2,864,679 | Hamm et al. | Dec. 16, 1958 |
| 2,864,739 | Scott et al. | Dec. 16, 1958 |
| 2,868,633 | Goodhue | Jan. 13, 1959 |
| 2,878,144 | Conbere et al. | Mar. 17, 1959 |
| 2,898,261 | Youngson | Aug. 4, 1959 |